Figure 1:
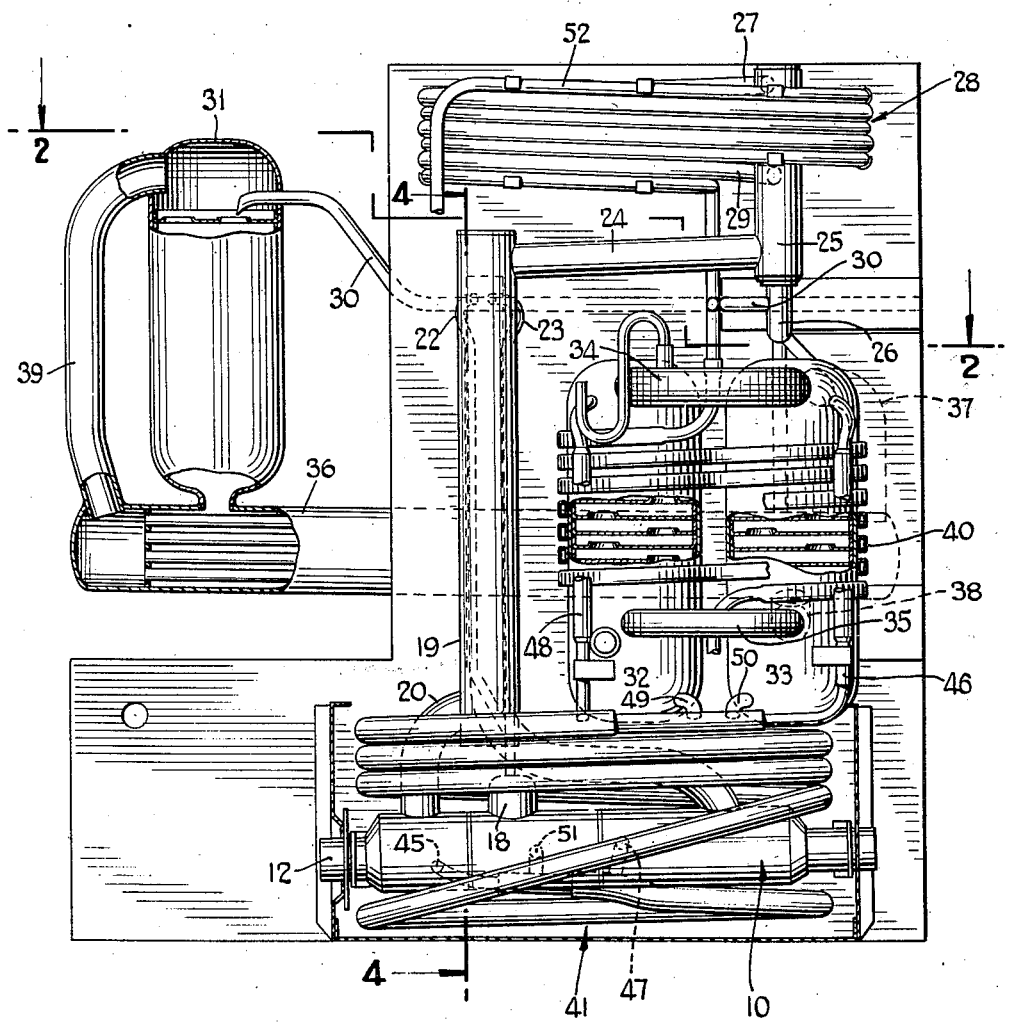

May 16, 1933.  D. B. KNIGHT  1,908,901
ABSORPTION TYPE REFRIGERATING APPARATUS
Filed May 28, 1932  3 Sheets-Sheet 1

INVENTOR.
Donald B. Knight
BY
ATTORNEY

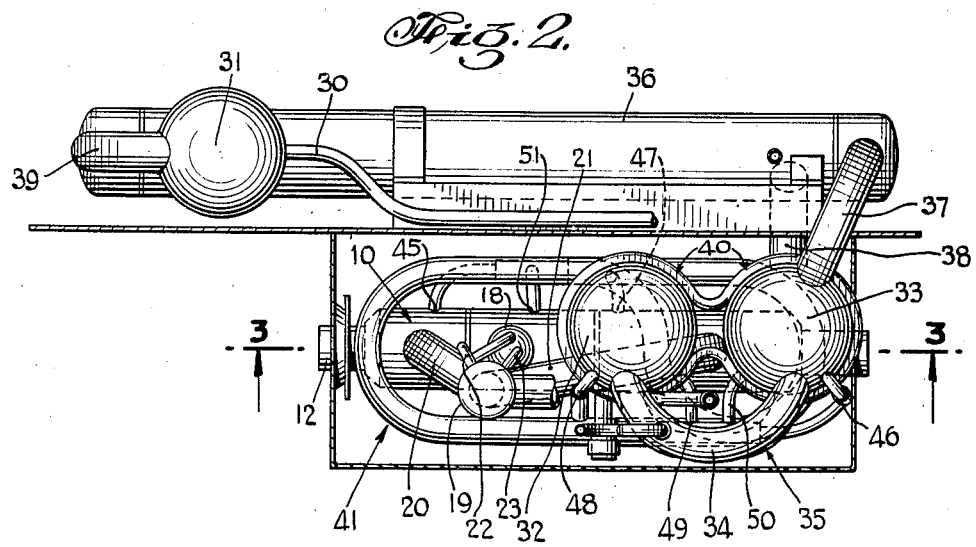
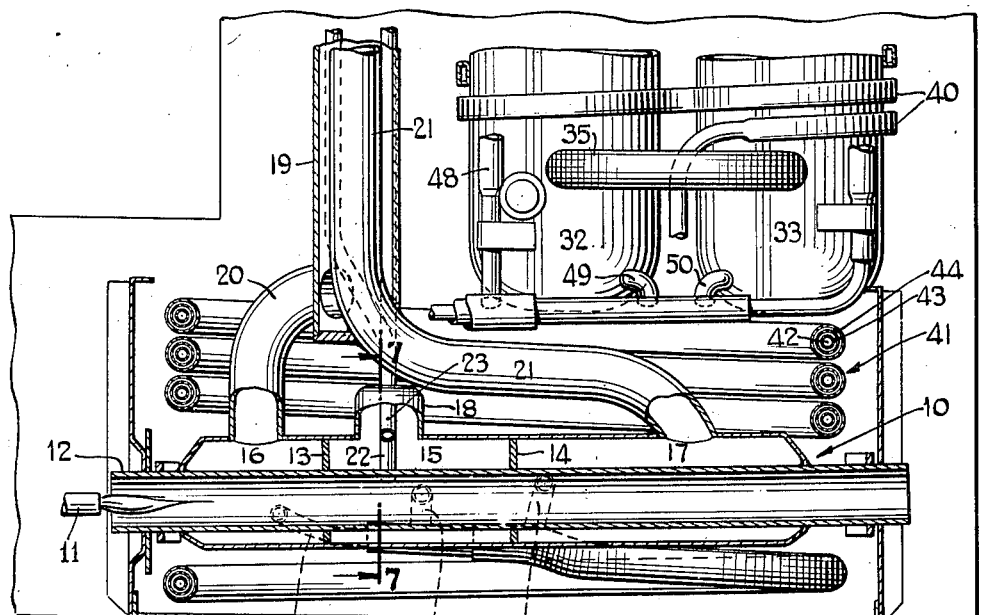

May 16, 1933. D. B. KNIGHT 1,908,901
ABSORPTION TYPE REFRIGERATING APPARATUS
Filed May 28, 1932 3 Sheets-Sheet 3
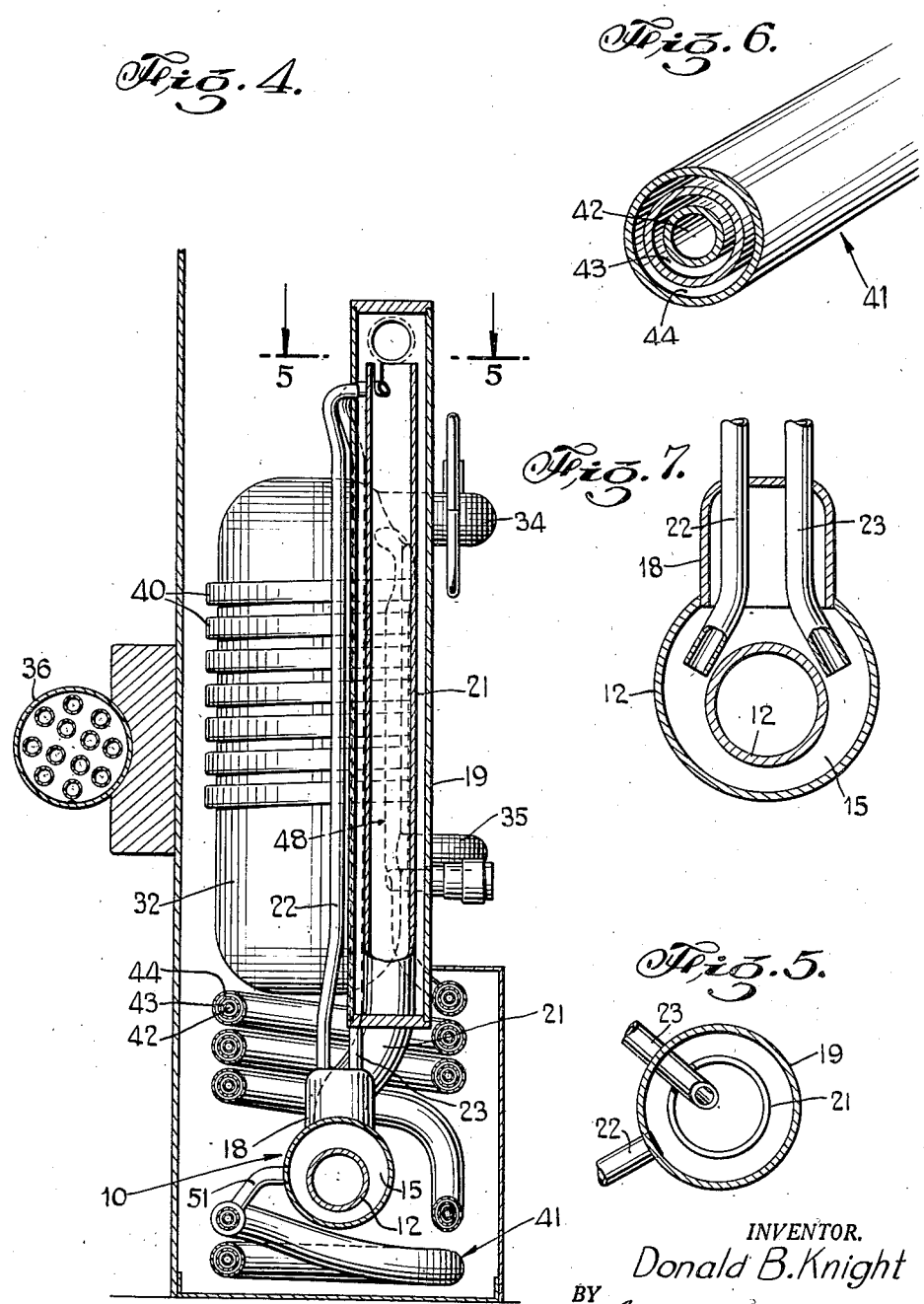
INVENTOR.
Donald B. Knight
BY
ATTORNEY Patented May 16, 1933

1,908,901

UNITED STATES PATENT OFFICE

DONALD B. KNIGHT, OF BROOKLYN, NEW YORK, ASSIGNOR TO ELECTROLUX SERVEL CORPORATION, OF NEW YORK, N. Y., A CORPORATION OF DELAWARE

ABSORPTION TYPE REFRIGERATING APPARATUS

Application filed May 28, 1932. Serial No. 614,185.

This invention relates to absorption type refrigerating systems and more particularly to continuous systems in which circulates an inert pressure equalizing medium.

When such refrigerating systems are employed for cooling household refrigerators, ice cream cabinets and the like, it will be readily appreciated that the height of the apparatus unit is a very necessary consideration. Another important factor is the capacity of the unit. The greater the capacity of the unit the greater must be the absorption liquid surface presented to the gas in the absorber. This may be accomplished by increasing the number of baffle plates in the absorber or increasing the size of each baffle plate. In the first case the height of the absorber must be increased and in the second place the resistance to the transfer of heat of absorption to the absorber cooling means is correspondingly increased, thus decreasing the efficiency of the system.

In accordance with this invention the capacity of an absorption refrigerating apparatus is increased without increasing the height of the unit. This is accomplished by utilizing a plurality of absorbers connected in parallel in the gas circuit and providing means for distributing weak absorption liquid to the absorber from the generator. The invention will be more fully understood by reference to the following description taken in connection with the accompanying drawings, in which, Fig. 1 is a front elevation of a refrigerating unit contemplated by this invention;

Fig. 2, a section taken on line 2—2 of Fig. 1;

Fig. 3, a section taken on line 3—3 of Fig. 2;

Fig. 4, a section taken on line 4—4 of Fig. 1;

Fig. 5, a section taken on line 5—5 of Fig. 4;

Fig. 6, an enlarged cross section of the liquid heat exchanger shown in section in Figs. 3 and 4; and Fig. 7, a detail section of the generator taken on line 7—7 of Fig. 3.

The refrigerating system shown in the drawings and described below is that disclosed in Patent No. 1,830,203 to Alvar Lenning, modified in accordance with this invention and having the gas heat exchanger and the evaporator shifted horizontally to make the unit adaptable for assembly with an ice cream cabinet.

Referring to Figs. 1 and 3 of the drawings, the generator 10 of the horizontal type is adapted to be heated by a gas burner 11 in the flue 12 which extends horizontally through the generator. Partitions 13 and 14 divide the generator into a strong liquor chamber 15 and two weak liquor chambers 16 and 17. A dome 18 provides a vapor space for the strong liquor chamber 15.

Referring to Figs. 1, 3, and 4 a closed standpipe 19 is connected at the bottom through conduit 20 to one of the weak liquor chambers 16 in the generator 10 and a second standpipe 21 open at its upper end is located concentrically within the standpipe 19 and connected at its lower end to the other weak liquor chamber 17. From the strong liquor chamber 15 a first thermosiphon conduit 22 extends upwardly through the vapor dome 18 and into the upper end of the standpipe 19. A second similar thermosiphon conduit 23 is connected to discharge into the upper end of the inner standpipe 21, as best shown in Fig. 4. As is also shown in this figure the inner standpipe 21 extends somewhat above the discharge openings of the thermosiphon conduits to insure complete separation of the liquid discharged therefrom.

The upper end of the generator standpipe 19 is connected through conduit 24 to the casing 25 around one leg of the rectifier U-tube 26. The upper part of the casing is connected to the upper end 27 of the condenser 28 and the lower end 29 of the condenser is connected to the other leg of the U-tube 26 of the rectifier. An overflow conduit 30 from the U-tube 26 connects to the upper end of the evaporator 31.

In accordance with this invention two absorbers 32 and 33 are connected in parallel by a conduit 34 between their upper portions and conduit 35 between their lower portions. The bottom of the evaporator 31 communicates through the gas heat exchanger 36 and conduit 38 to the lower part of absorber 33 and the upper part of the latter communicates through conduit 37, gas heat exchanger 36 and conduit 39 with the upper part of the evaporator 31, as best shown in Figs. 1 and 2. The absorbers 32 and 33 are of a type well known in the art and are cooled by water circulating through coil 40.

As may be seen best in Figs. 1, 3, and 6 the liquid heat exchanger 41 is formed by three concentric pipe coils forming an inner passage 42, an intermediate passage 43, and an outer passage 44. Weak liquor chamber 16 of the generator 10 is connected through conduit 45, inner passage 42 of the heat exchanger 41, and conduit 46 to the upper part of absorber 33. The second weak liquor chamber 17 of the generator is connected through conduit 47, outer passage 44 of the liquid heat exchanger, and conduit 48 to the upper part of absorber 32. The lower parts of both absorbers 32 and 33 are connected through conduits 49 and 50 respectively, intermediate passage 43 of the liquid heat exchanger 41, and conduit 51 to the strong liquor chamber 15 in the generator 10.

Ammonia may be used as the cooling agent, water as the absorption liquid, and hydrogen as the inert pressure equalizing gas. Ammonia gas expelled from solution in the water by heating in the generator 10 passes from the upper end of the standpipe 19 through conduit 24 and casing 25 of the rectifier to the upper end 27 of the condenser 28. In the latter the ammonia is condensed by heat transfer to cooling water flowing in coil 52 and liquid ammonia flows from the lower end 29 of the condenser into the rectifier U-tube 26 from which it overflows through conduit 30 into the upper part of the evaporator 31.

In the evaporator the liquid ammonia evaporates by diffusion into hydrogen which also enters the evaporator at the top from conduit 39. The resulting gas mixture being heavier than the pure hydrogen passes from the bottom of the evaporator through heat exchanger 36 and conduit 38 into the lower part of absorber 33 and thence through conduit 35 into absorber 32.

Weak liquor from chamber 16 of the generator 10 passes through conduit 45, inner passage 42 of the liquid heat exchanger, and conduit 46 into the upper part of the absorber 33 where it flows downwardly absorbing ammonia out of the gas mixture. Weak liquid also flows from chamber 17 in the generator 10 through conduit 47, outer passage 44 of the liquid heat exchanger, and conduit 48 into the upper part of the absorber 32 where it flows downwardly absorbing ammonia out of the gas mixture. The hydrogen being lighter than the gas mixture passes from the upper part of absorber 32 through conduit 34 and the upper part of absorber 33 through conduit 37 back to the upper part of the evaporator 31 via the gas heat exchanger 36 and conduit 39.

Enriched absorption liquid accumulates in the bottom of both absorbers and flows through conduits 49 and 50, intermediate passage 43 of the liquid heat exchanger 41, and conduit 51 into chamber 15 of the generator 10. Due to heating of the liquid in chamber 15 ammonia gas is collected in the vapor space under the dome 18 and the enriched liquor is raised by thermosiphonic action, as well known in the art, through the thermosiphon conduits 22 and 23 into the upper part of the generator standpipes 19 and 21 respectively. For a more detailed explanation of this system except for the double absorber and means for distributing the weak liquor from the generator, reference may be had to the above mentioned Patent No. 1,830,203 to Lenning.

It will be obvious to those skilled in the art that various other changes may be made in the construction and arrangement without departing from the spirit of the invention and therefore the invention is not limited to what is shown in the drawings and described in the specification but only as indicated in the appended claims.

I claim:

1. A refrigerating system of the absorption type including a generator, condenser, evaporator and a plurality of absorbers, said generator comprising a plurality of weak liquor chambers and a strong liquor chamber, a conduit from each weak liquor chamber to a corresponding absorber, a conduit from each absorber to said strong liquor chamber, and thermosiphon conduits from said strong liquor chamber to each of said weak liquor chambers.

2. Refrigerating apparatus of the absorption type including a generator, condenser, evaporator, and a plurality of absorbers, said generator comprising a closed horizontal vessel divided into a plurality of weak liquor chambers and a strong liquor chamber, a standpipe extending upwardly from each weak liquor chamber, a conduit from each weak liquor chamber to a corresponding absorber, a conduit from each absorber to said strong liquor chamber, and a thermosiphon conduit from said strong liquor chamber to each standpipe.

3. A generator for absorption type refrigerating apparatus comprising a closed horizontal vessel divided into three chambers, a standpipe extending upwardly from each of two of said chambers, and a thermosiphon conduit from the third chamber to each of said standpipes.

4. A generator for refrigerating apparatus of the absorption type comprising a closed horizontal vessel divided into three chambers, means for applying heat to said chambers, a standpipe extending upwardly from one of said chambers and closed at its upper end, a second standpipe open at the upper end extending from another of said chambers upwardly within the first said standpipe, and a thermosiphon conduit from the third of said chambers into the upper part of each of said standpipes.

5. A generator for refrigerating apparatus of the absorption type comprising a horizontally elongated vessel divided into three chambers, a heating flue extending through said chambers, standpipes extending upwardly from two of said chambers and communicating at their upper ends, and thermosiphonic means for raising liquid from the third of said chambers into each of said standpipes.

6. A refrigerating system comprising a generator adapted to contain a solution of refrigerant in an absorption liquid, a plurality of absorbers, an evaporator connected to said absorbers in parallel for the circulation of an inert gas therebetween, a condenser connected to receive vapor from said generator and discharge liquid into said evaporator, means for distributing weak absorption liquid from said generator to said absorbers, and means for returning enriched absorption liquid from said absorbers to said generator.

In testimony whereof, I affix my signature.

DONALD B. KNIGHT.